US011195037B2

(12) United States Patent
Lu et al.

(10) Patent No.: US 11,195,037 B2
(45) Date of Patent: Dec. 7, 2021

(54) LIVING BODY DETECTION METHOD AND SYSTEM, COMPUTER-READABLE STORAGE MEDIUM

(71) Applicant: BEIJING KUANGSHI TECHNOLOGY CO., LTD., Beijing (CN)

(72) Inventors: Jianghu Lu, Beijing (CN); Peng Wang, Beijing (CN); Cong Yao, Beijing (CN); Yahao Sun, Beijing (CN)

(73) Assignee: BEIJING KUANGSHI TECHNOLOGY CO., LTD., Beijing (CN)

( * ) Notice: Subject to any disclaimer, the term of this patent is extended or adjusted under 35 U.S.C. 154(b) by 103 days.

(21) Appl. No.: 16/212,119

(22) Filed: Dec. 6, 2018

(65) Prior Publication Data

US 2020/0005061 A1 Jan. 2, 2020

(30) Foreign Application Priority Data

Jun. 28, 2018 (CN) .......................... 201810695586.6

(51) Int. Cl.
*G06K 9/00* (2006.01)
*G06T 7/194* (2017.01)
(Continued)

(52) U.S. Cl.
CPC ..... *G06K 9/00906* (2013.01); *G06K 9/00718* (2013.01); *G06K 9/6262* (2013.01);
(Continued)

(58) Field of Classification Search
CPC . G06T 7/194; G06T 7/11; G06T 2207/10016; G06T 2207/20081;
(Continued)

(56) References Cited

U.S. PATENT DOCUMENTS

2015/0310624 A1* 10/2015 Bulan .................. G06T 7/215
382/103
2016/0012277 A1* 1/2016 Tate ..................... G06K 9/34
382/159
(Continued)

FOREIGN PATENT DOCUMENTS

CN 103810717 A 5/2014
CN 105243376 A 1/2016
(Continued)

OTHER PUBLICATIONS

First Office Action for Chinese application No. 201810695586.6, dated May 6, 2020, with English translation.
(Continued)

*Primary Examiner* — Golam Sorowar
(74) *Attorney, Agent, or Firm* — Marshall, Gerstein & Borun LLP

(57) ABSTRACT

A living body detection method and system, and a computer-readable storage medium are disclosed. The living body detection method includes: acquiring a video including an object to be detected; extracting at least two images to be detected from the video, and determining optical flow information according to the at least two images to be detected; dividing each image to be detected into a foreground image and a background image according to the optical flow information; using a classifier to perform category judgment on the foreground image and the background image to obtain a category distribution of the foreground image and a category distribution of the background image; and obtaining a probability that the object to be detected is a living body according to the category distribution of the foreground image and the category distribution of the background image.

10 Claims, 5 Drawing Sheets

(51) Int. Cl.
*G06T 7/11* (2017.01)
*G06T 7/246* (2017.01)
*G06K 9/62* (2006.01)

(52) U.S. Cl.
CPC .............. *G06T 7/11* (2017.01); *G06T 7/194* (2017.01); *G06T 7/248* (2017.01); *G06T 2207/10016* (2013.01); *G06T 2207/20076* (2013.01); *G06T 2207/20081* (2013.01); *G06T 2207/20084* (2013.01); *G06T 2207/30196* (2013.01)

(58) Field of Classification Search
CPC ............. G06T 2207/30232; G06T 7/20; G06T 2207/20084; G06T 2207/30236; G06T 7/254; G06T 2207/30196; G06T 7/174; G06T 7/215; G06T 7/248; G06T 7/74; G06T 11/60; G06T 17/10; G06T 2200/04; G06T 2207/10021; G06K 9/00771; G06K 9/00718; G06K 9/38; G06K 9/6256; G06K 9/34; G06K 9/00201; G06K 9/00785; G06K 9/6267; G06K 9/00664; G06K 9/00744; G06K 9/3233; G06K 9/6227; G06K 9/6263; G06K 9/627; G06K 9/6271; G06K 9/66; G06K 2009/00738; G06K 2009/3291; G06K 2209/21; G06N 20/20; G06N 3/0445; G06N 3/0454; G06N 3/0472; G06N 3/08; G06N 3/084; G06N 3/088; G06N 7/005
See application file for complete search history.

(56) References Cited

U.S. PATENT DOCUMENTS

| | | | | |
|---|---|---|---|---|
| 2017/0270674 | A1* | 9/2017 | Shrivastava | ............ G06T 11/60 |
| 2018/0060653 | A1* | 3/2018 | Zhang | ................ G06K 9/00771 |
| 2019/0377949 | A1* | 12/2019 | Chen | .................. G06K 9/00664 |

FOREIGN PATENT DOCUMENTS

| | | |
|---|---|---|
| CN | 107798653 A | 3/2018 |
| CN | 107818313 A | 3/2018 |
| CN | 107862247 A | 3/2018 |
| CN | 108090403 A | 5/2018 |
| CN | 108154090 A | 6/2018 |
| WO | WO-2015181729 A1 | 12/2015 |

OTHER PUBLICATIONS

Gan Junying et al. 3D Convolutional Neural Network Based on Face Ani-Spoofing Journal of Signal Processing 20171130 vol. 33 No. 11.
Second Chinese Office Action for Application No. 201810695586.6, with a English translation and dated Mar. 3, 2021.

\* cited by examiner

LIVING BODY DETECTION METHOD AND SYSTEM, COMPUTER-READABLE STORAGE MEDIUM

CROSS-REFERENCE TO RELATED APPLICATION

The present application claims priority of the Chinese Patent Application No. 201810695586.6, filed on Jun. 28, 2018, the disclosure of which is incorporated herein by reference in its entirety as part of the present application.

TECHNICAL FIELD

The embodiments of the present disclosure relate to a living body detection method, a living body detection system, and a computer-readable storage medium.

BACKGROUND

In a biometric identification system, in order to prevent a malicious person from forging and stealing other people's biological characteristics for identity authentication, the biometric authentication system needs to have a living body detection function, that is, to determine whether the submitted biological characteristics are from a living individual. Living body detection technology includes silent living-body judgment. The video-based silent living-body judgment means that a front-end device collects a video of 2-3 seconds, and a background uses the video for living body detection to determine whether the current biological characteristic is from an attack or a living body.

At present, there are few techniques for video-based living body detection, the living body detection technology mainly adopts the technology that judges the living-body based on static images. Compared with a method that judges the living-body based on static images, a video living-body judgment method provides additional time domain information, is a new type of anti-attack and cheat-proof method and is widely applied in industries such as bank and insurance that require face verification.

SUMMARY

The embodiments of the present disclosure is to provide a living body detection method and system, and a computer-readable storage medium, in the living body detection method, living body detection is performed based on a video of an object to be detected, and a foreground and a background can be divided, so as to preserve more local feature information and improve accuracy of judgment.

In a first aspect, an embodiment of the present disclosure provides a living body detection method, comprising: acquiring a video including an object to be detected; extracting at least two images to be detected from the video, and determining optical flow information according to the at least two images to be detected; dividing each image to be detected into a foreground image and a background image according to the optical flow information; using a classifier to perform category judgment on the foreground image and the background image to obtain a category distribution of the foreground image and a category distribution of the background image; and obtaining a probability that the object to be detected is a living body according to the category distribution of the foreground image and the category distribution of the background image.

Illustratively, the classifier comprises a neural network model, using the classifier to perform category judgment on the foreground image and the background image to obtain the category distribution of the foreground image and the category distribution of the background image comprises: inputting the foreground image and the background image into the neural network model; and using the neural network model to perform the category judgment on the foreground image and the background image to obtain the category distribution of the foreground image and the category distribution of the background image.

Illustratively, dividing each image to be detected into the foreground image and the background image according to the optical flow information comprises: determining that each pixel belongs to foreground or background according to a motion rate of each pixel in the optical flow information; and combining pixels belonging to the foreground in each image to be detected into the foreground image, and combining pixels belonging to the background in each image to be detected into the background image.

Illustratively, determining that each pixel belongs to the foreground or the background according to the motion rate of each pixel in the optical flow information comprises: determining the motion rate of each pixel in each image to be detected according to the optical flow information; and judging whether a motion rate of a pixel is greater than a preset rate threshold, determining that the pixel belongs to the foreground in a case where the motion rate of a pixel is greater than the preset rate threshold, and determining that the pixel belongs to the background in a case where the motion rate of a pixel is not greater than the preset rate threshold.

Illustratively, determining the motion rate of each pixel in each image to be detected according to the optical flow information comprises: acquiring X-channel information and Y-channel information of each pixel in each image to be detected, the X-channel information and the Y-channel information respectively representing a motion rate in an X direction and a motion rate in a Y direction; and determining a larger value between the motion rate of the X direction and the motion rate of the Y direction as the motion rate of each pixel.

Illustratively, obtaining the probability that the object to be detected is a living body according to the category distribution of the foreground image and the category distribution of the background image comprises: respectively acquiring a first probability that the foreground image belongs to a living-body category and a second probability that the background image belongs to the living-body category according to the category distribution of the foreground image and the category distribution of the background image; and fusing the first probability and the second probability through a preset fusion algorithm to obtain the probability that the object to be detected is a living body.

Illustratively, the living body detection method further comprises: judging whether the probability that the object to be detected is a living body is greater than a preset living-body probability threshold; and determining that the object to be detected is a living body in a case where the probability that the object to be detected is a living body is greater than a preset living-body probability threshold.

Illustratively, the living body detection method further comprises: acquiring sample video data, the sample video data comprising foreground sets and background sets corresponding to sample videos, and the sample videos comprising a living-body video and an attack video; dividing the sample video data into a training set, a validation set and a test set; training a 3D neural network model by using the training set; stopping training when the 3D neural network model is adopted to classify the validation set to obtain a classification accuracy and the classification accuracy is greater than a preset accuracy threshold; and testing the 3D neural network model by using the test set, and determining the 3D neural network model obtained after the testing as the neural network model used for living body detection.

Illustratively, after acquiring the sample video data, the living body detection method further comprises: performing a pre-processing operation on sample images extracted from the sample videos, the pre-processing operation at least comprising one of following operations: flipping, cutting or resolution adjustment.

In a second aspect, an embodiment of the present disclosure provides a living body detection device, comprising: an acquisition module configured to acquire a video including an object to be detected; an extraction module configured to extract at least two images to be detected from the video and determine optical flow information according to the at least two images to be detected; a division module configured to divide each image to be detected into a foreground image and a background image according to the optical flow information; a classification module configured to use a classifier to perform category judgment on the foreground image and the background image to obtain a category distribution of the foreground image and a category distribution of the background image; and a probability determination module configured to obtain a probability that the object to be detected is a living body according to the category distribution of the foreground image and the category distribution of the background image.

In a third aspect, an embodiment of the present disclosure provides a living body detection system, and the living body detection system comprises: a video capture device, a processor and a storage device. The video capture device is configured to capture a video including an object to be detected; computer programs are stored in the storage device, and when the computer programs are executed by the processor, steps of the living body detection method according to the first aspect are performed.

In a fourth aspect, an embodiment of the present disclosure provides a computer-readable storage medium. Computer programs are stored on the computer-readable storage medium, and when the computer programs are executed by a processor, steps of the living body detection method according to the first aspect are performed.

The embodiments of the present disclosure provide a living body detection method and system, and a computer-readable storage medium. The image to be detected can be divided into the foreground image and the background image according to the optical flow information of the video to be detected, the foreground image and the background image can be inputted into the classifier (for instance, the classifier includes the pre-trained convolutional neural network model) for category judgment, so as to obtain the category distribution of the foreground image and the category distribution of the background image, and then a probability that the object to be detected is a living body can be obtained according to the category distribution of the foreground image and the category distribution of the background image. The above method performs the living body detection by adopting the optical flow information, does not need the user to perform actions such as nodding, head shaking or the like, thereby improving the user experience; and the motion rate of each pixel in the image to be detected is respectively determined according to the optical flow information, so as to achieve foreground and background division of the image to be detected, thus the interference of the background to the foreground motion recognition in the process of feature extraction can be effectively reduced, more local information can be preserved, and the recognition accuracy can be improved.

Other characteristics and advantages of the embodiments of the present disclosure will be described in the subsequent description, alternatively, partial characteristics and advantages can be inferred or unambiguously determined from the description or can be known by the implementation of the above technology of the present disclosure.

In order to more clearly understand the characteristics and advantages of the present disclosure, detailed descriptions will be given below to the preferred embodiments with reference to the accompanying drawings.

BRIEF DESCRIPTION OF THE DRAWINGS

In order to clearly illustrate the technical solutions of the embodiments of the disclosure or the technical solutions in the prior art, the drawings used in detail descriptions of the specific implementations or the prior art will be briefly described in the following; it is obvious that the described drawings are only related to some implementations of the present disclosure, and those skilled in the art can obtain other drawing(s) according to these drawings, without inventive efforts.

DETAILED DESCRIPTION

In order to make objects, technical details and advantages of the embodiments of the disclosure apparent, the technical solutions of the embodiments will be described in a clearly and fully understandable way with reference to the drawings related to the embodiments of the disclosure. Apparently, the described embodiments are just a part but not all of the embodiments of the disclosure. Based on the described embodiments herein, all other embodiments obtained by those skilled in the art without paying inventive efforts should be within the scope of the disclosure.

A current video living body detection method cannot well preserve local feature information during a process of using RGB (red, green and blue) images and optical flow information, and more attention is paid to high-level information, which affects recognition accuracy. In order to solve this problem, embodiments of the present disclosure provide a living body detection method, a living body detection device, a living body detection system, and a computer-readable storage medium. Detailed descriptions will be given below to the embodiments of the present disclosure.

Firstly, an illustrative electronic device 100 for implementing the living body detection method, device and system will be described with reference to FIG. 1.

Figure 1:
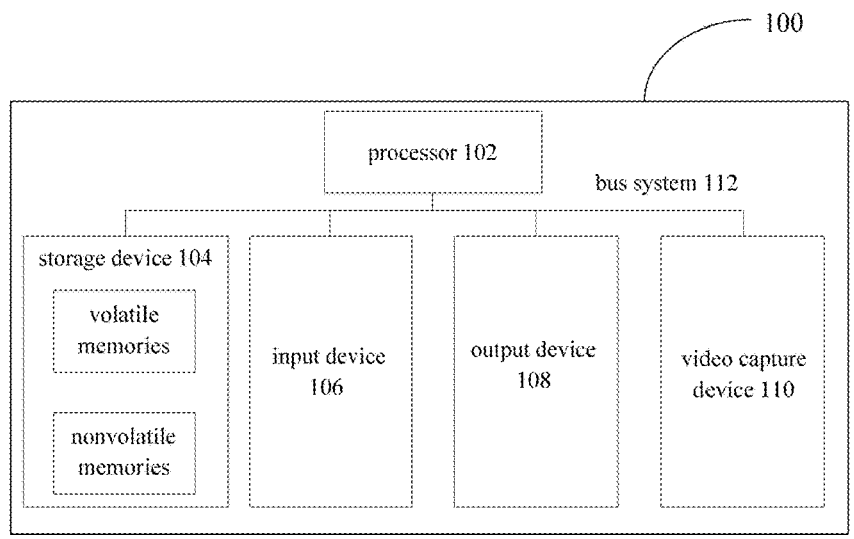
FIG. 1 is a schematic structural view of an electronic device provided by at least an embodiment of the present disclosure.

FIG. 1 is a schematic structural view of an electronic device. The electronic device 100 comprises one or more processors 102, one or more storage devices 104, an input device 106, an output device 108 and a video capture device 110. These components are interconnected through a bus system 112 and/or other forms of connection mechanisms (not shown). It should be noted that the components and the structure of the electronic device 100 as shown in FIG. 1 are only exemplary and not limitative, and the electronic device 100 may also comprise other components and structures as required.

The processor 102 may be implemented by at least one hardware form selected from a group consisting of a microprocessor unit (MPU), a digital signal processor (DSP), a field programmable gate array (FPGA) or a programmable logic array (PLA). The processor 102 may be a central processing unit (CPU) or one or any combination of several of processing units in other forms having a data processing capability and/or an instruction execution capability, and can control other components in the electronic device 100 to perform desired functions.

The storage device 104 may include one or more computer program products. The computer program products may include computer readable storage media in various forms, e.g., volatile memories and/or nonvolatile memories. The volatile memories, for instance, may include random access memories (RAMs) and/or caches or the like. The nonvolatile memories, for instance, may include read-only memories (ROMs), hard disks, flash memories, etc. One or more computer program instructions may be stored on the computer readable storage medium. The processor 102 may execute the program instructions to implement client functions and/or other desired functions (implemented by a processor) in the embodiments of the present disclosure below. The computer readable storage medium may also store various applications and various data, e.g., various kinds of data used and/or generated by the applications, and the like.

The input device 106 may be a device used by a user to input instructions and may include one or more of a keyboard, a mouse, a microphone, a touch panel, and the like.

The output device 108 may output various kinds of information (e.g., an image or a voice) to the outside (e.g., the user) and may include one or more of a display, a loudspeaker, etc. Optionally, the input device 106 and the output device 108 may be integrated together and be implemented by the same interactive device (e.g., a touch panel).

The video capture device 110 can capture videos desired by a user, and the captured videos are stored in the storage device 104 for use by other components.

Illustratively, the illustrative electronic device for implementing the living body detection method, device and system provided by an embodiment of the present disclosure may be implemented as a smart terminal such as a smart mobile phone, a tablet PC, a computer, or the like.

Figure 2:
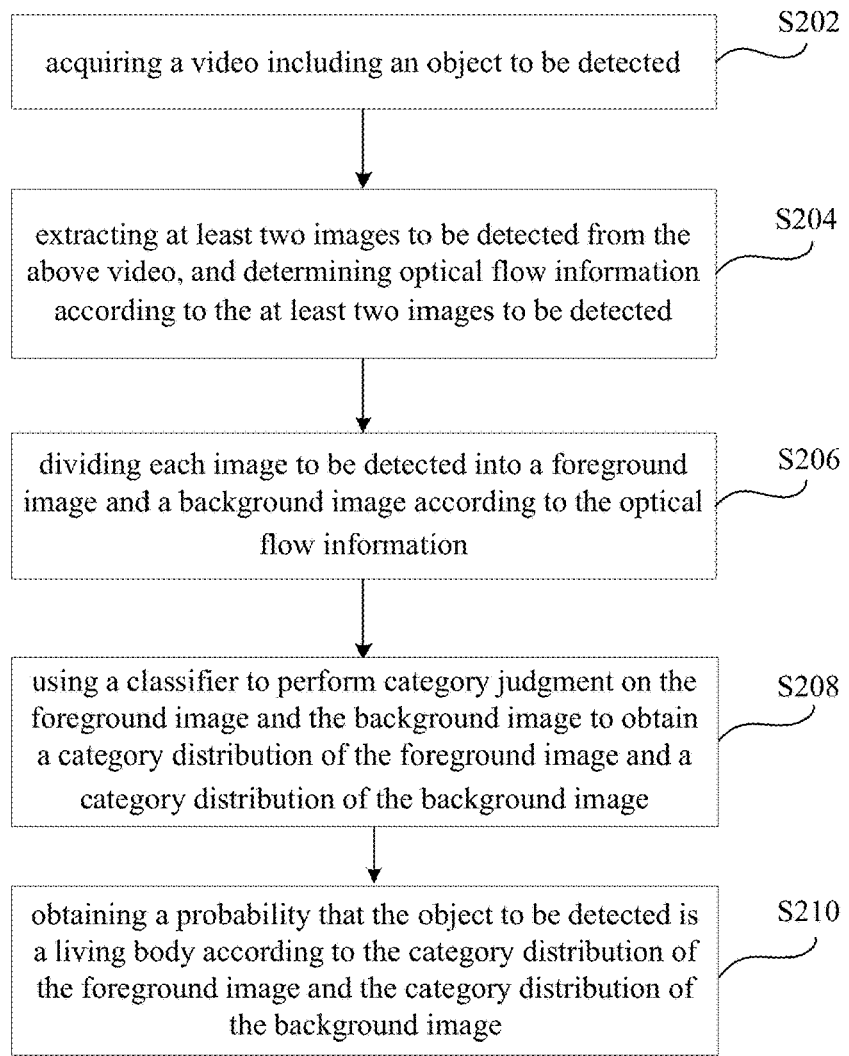
FIG. 2 is a flowchart of a living body detection method provided by at least an embodiment of the present disclosure.

With reference to the flowchart of a living body detection method as shown in FIG. 2, a living body detection method may be performed by the electronic device provided by the foregoing embodiment, and the living body detection method specifically comprises following steps:

S202: acquiring a video including an object to be detected.

In the embodiment of the present disclosure, a pick-up device may be adopted for the video capture of the object to be detected, and the captured video is taken as a video to be detected (namely the video including the object to be detected); or a video including the object to be detected sent by other devices may also be taken as the video to be detected.

S204: extracting at least two images to be detected from the above video, and determining optical flow information according to the at least two images to be detected.

For instance, the image to be detected may be obtained by extracting each frame of the video to be detected; or the image to be detected may also be obtained by extracting partial frames of the video to be detected. The image to be detected, for instance, may be an RGB image, namely a color image. For instance, when the length of the video to be detected is relatively long, partial video clips in the video to be detected can be intercepted, and the partial video clips are subjected to frame-by-frame extraction to obtain a plurality of images to be detected (e.g., RGB images).

It should be understood that the video to be detected may also be subjected to video frame extraction for every few frames to obtain a plurality of images to be detected, as long as correct optical flow information can be determined according to an optical flow method. Optical flow information refers to the instantaneous velocity of the pixel motion of a spatial moving object on an observation imaging plane. The optical flow method is a method that uses the change of pixels in the image sequence in the time domain and the correlation between adjacent frames to find the correspondence between the previous frame and the current frame, thereby calculating the motion information of the object between adjacent frames.

After the step of extracting the plurality of images to be detected, the optical flow information can be determined according to at least two images to be detected of the plurality of images to be detected. The optical flow information includes a motion rate of pixels in each image to be detected. In the embodiment, an existing optical flow method may be adopted to determine the optical flow information. No limitation will be given here in the embodiment.

S206: dividing each image to be detected into a foreground image and a background image according to the optical flow information.

After the optical flow information is obtained, the motion rate of each pixel in the image to be detected can be obtained from the optical flow information. Whether a pixel belongs to the foreground image or the background image can be determined according to the motion rate of the pixel. For instance, pixels with a high motion rate are taken as pixels in the foreground image, and pixels with a low motion rate are taken as pixels in the background image. The foreground image includes interested areas, and the background image only includes uninterested areas. The motion rate of each pixel in the image to be detected is respectively predicted based on the optical flow information, so as to divide each image to be detected into a foreground image and a background image, thereby reducing the interference of the background to the foreground in the motion recognition process and improving the recognition accuracy.

S208: using a classifier to perform category judgment on the foreground image and the background image to obtain a category distribution of the foreground image and a category distribution of the background image.

For instance, in some embodiments, the classifier includes a neural network model, and the step S208 may include: inputting the foreground image and the background image into the neural network model; and using the neural network model to perform the category judgment on the foreground image and the background image, so as to obtain the category distribution of the foreground image and the category distribution of the background image.

It should be noted that the classifier may also be other machine learning classifiers, as long as the classifier can achieve a function of performing the category judgment on the foreground image and the background image and obtaining the category distribution of the foreground image and the category distribution of the background image. No limitation will be given to the specific type of the classifier in the present disclosure.

For instance, the neural network model may be a convolutional neural network (CNN) model. In the step S208, the CNN model has been trained based on videos not including a living body (attack videos) and videos including the living body (e.g., real person videos), that is, the CNN model is a pre-trained CNN model, so that the CNN model can perform the category judgment on the inputted foreground image and background image and output the category distribution of the foreground image and the category distribution of the background image. In a process of training and judging, a set of a plurality of foreground images or a plurality of background images of the video can be inputted into the CNN model as a whole. For instance, foreground images of the plurality of images to be detected are all added into a foreground set, and the foreground set is taken as a foreground sample and inputted into the CNN model; and background images of the plurality of images to be detected are all added into a background set, and the background set is taken as a background sample and inputted into the CNN model. The category of each image (e.g., the foreground image or the background image) may be an attack category or a living-body category. The category distribution indicates a probability that the foreground set or the background set belongs to the attack category and a probability that the foreground set or the background set belongs to the living-body category.

It should be understood that a sum of a probability that the foreground set belongs to the attack category and a probability that the foreground set belongs to the living-body category is 1, and a sum of a probability that the background set belongs to the attack category and a probability that the background set belongs to the living-body category is also 1.

S210: obtaining a probability that the object to be detected is a living body according to the category distribution of the foreground image and the category distribution of the background image.

After the classifier outputs the category distribution of the foreground image and the category distribution of the background image, the category distributions of the two (namely the foreground image and the background image) can be fused to obtain a probability distribution of the object to be detected, thereby obtaining a probability that the object to be detected is a living body. In the category distribution of the foreground image and the category distribution of the background image, a first probability that the foreground image belongs to the living-body category and a second probability that the background belongs to the living-body category can be respectively acquired, and then the first probability and the second probability are fused by using a preset fusion algorithm to obtain the probability that the object to be detected is a living body.

It should be understood that, not only the probability that the foreground image belongs to the living-body category and the probability that the background image belongs to the living-body category can be fused to obtain the probability that the object to be detected belongs to the living-body category (namely a living body, e.g., a real person); but also the probability that the foreground image belongs to the attack category and the probability that the background image belongs to the attack category can be fused to obtain the probability that the object to be detected belongs to the attack category (namely a non-living body). The preset fusion algorithm, for instance, may be an averaging algorithm or a weighting algorithm. For instance, after the probability that the foreground set belongs to the living-body category and the probability that the background set belongs to the living-body category are obtained, the probabilities of the two (namely the foreground set and the background set) are averaged to obtain an average value, and the average value is taken as the probability that the object to be detected belongs to the living-body category; or after multiplying the probability of the foreground set by a corresponding weight coefficient to obtain a weight probability of the foreground set and multiplying the probability of the background set by a corresponding weight coefficient to obtain a weight probability of the background set, the weight probability of the foreground set and the weight probability of the background set are averaged to obtain an average value, and the average value is taken as the probability that the object to be detected belongs to the living-body category. The probability is a probability that the object to be detected is a living body.

In the living body detection method provided by the embodiment of the present disclosure, the image to be detected can be divided into the foreground image and the background image according to the optical flow information of the video to be detected, the foreground image and the background image can be inputted into the classifier (for instance, the classifier includes the pre-trained CNN model) for category judgment, so as to obtain the category distribution of the foreground image and the category distribution of the background image, and then a probability that the object to be detected is a living body can be obtained according to the category distribution of the foreground image and the category distribution of the background image. The above method performs the living body detection by adopting the optical flow information, does not need the user to perform actions such as nodding, head shaking or the like, thereby improving the user experience; and the motion rate of each pixel in the image to be detected is respectively determined according to the optical flow information, so as to achieve foreground and background division of the image to be detected, thus the interference of the background to the foreground motion recognition in the process of feature extraction can be effectively reduced, more local information can be preserved, and the recognition accuracy can be improved.

In addition, after obtaining the probability that the object to be detected is a living body, the living body detection method provided by the embodiment can judge whether the probability that the object to be detected is a living body is greater than a preset living-body probability threshold, determine that the object to be detected is a living body and the video to be detected including the object to be detected is a living body video in a case where the probability that the object to be detected is a living body is greater than the preset living-body probability threshold, and determine that the object to be detected is an attack and the video to be detected including the object to be detected is an attack video in a case where the probability that the object to be detected is a living body is not great than the preset living-body probability threshold.

After the step of determining the optical flow information according to the at least two images to be detected, the above step of dividing each image to be detected into the foreground image and the background image according to the optical flow information, for instance, may comprise following steps:

S2061: determining that each pixel belongs to foreground or background according to the motion rate of each pixel in the optical flow information. For instance, the motion rate of each pixel in the optical flow information can be determined at first, and then whether the motion rate of each pixel in the optical flow information is greater than a preset rate threshold can be determined; in a case where the motion rate of a pixel is greater than the preset rate threshold, determining that the pixel belongs to the foreground; and in a case where the motion rate of the pixel is less than or equal to the preset rate threshold, determining that the pixel belongs to the background. The preset rate threshold, for instance, may be 1.5.

Because the optical flow information includes X-channel information and Y-channel information which respectively indicate a motion rate in an X direction and a motion rate in a Y direction, and the division of foreground and background is only sensitive to the maximum motion rate of a specific pixel, a larger value between the absolute values of both (namely the absolute value of the motion rate in the X direction and the absolute value of the motion rate in the Y direction) can be taken as the motion rate of the pixel, namely an X channel and a Y channel are merged into one composite channel, and the value of the composite channel takes the larger value between the absolute values of the values of the two channels (namely the X channel and the Y channel). For instance, in a case where the absolute value of the X channel is greater than the absolute value of the Y channel, the value of the composite channel is the absolute value of the value of the X channel; and in a case where the absolute value of the value of the X channel is less than the absolute value of the value of the Y channel, the value of the composite channel is the absolute value of the value of the Y channel.

For instance, the step S2061 may include following steps: acquiring X-channel information and Y-channel information of each pixel in the optical flow information, the X-channel information indicating a motion rate in the X direction and the Y-channel information indicating a motion rate in the Y direction; and determining a larger value between the motion rate in the X direction and the motion rate in the Y direction as the motion rate of the pixel. For instance, the X direction and the Y direction are perpendicular to each other; the X direction may be a horizontal direction; and the Y direction may be a vertical direction.

S2062: combining all pixels belonging to the foreground in the image to be detected into the foreground image, and combining all pixels belonging to the background in the image to be detected into the background image.

After determining that each pixel in the image to be detected belongs to the foreground or the background, all the pixels in the image to be detected can be divided according to the properties (for instance, the property of a pixel indicates that the pixel belongs to the foreground or the background) of the pixels; the pixels belonging to the foreground are combined into the foreground image; and the pixels belonging to the background are combined into the background image.

Before the category judgment is performed by using the neural network model (e.g., the CNN model), the neural network model must be trained in advance. The training process can be performed according to following steps:

S401: acquiring sample video data, the sample video data including foreground sets, background sets and category labels corresponding to sample videos. According to the needs of training, the sample videos include living-body videos and attack videos. After acquiring the sample video data, sample images (e.g., RGB images) extracted from the sample videos may be first pre-processed and then trained, a pre-processing operation at least includes one of following operations: flipping, random cutting or resolution adjustment; and the randomness of the sample videos can be increased by the above pre-processing. Optical flow information extraction and foreground and background division are performed on the sample videos, to obtain corresponding foreground sets and background sets.

S402: dividing the sample video data into a training set, a verification set and a test set. The training set is used for training the neural network model; the verification set is used for verifying the accuracy of the trained neural network model; and the test set is used for testing the trained neural network model to find a better neural network model. The sample videos in the training set, the sample videos in the verification set and the sample videos in the test set all simultaneously include a living-body video and an attack video.

S403: training a 3D neural network model by using the training set, namely inputting the training set into the 3D neural network model (i.e., a three-dimensional neural network model) for training.

For instance, the 3D neural network model may be a 3D convolutional neural network model.

S404: stopping training when the 3D neural network model is adopted to classify the verification set to obtain the classification accuracy and the classification accuracy is greater than a preset accuracy threshold. The sample video data in the verification set is inputted into the 3D neural network model to obtain a classification result that the sample video data belong to the living-body video or the attack video, and a correct rate of the classification result is the classification accuracy of the 3D neural network model. The preset accuracy threshold can be determined according to factors such as parameters, accuracy and the like of the 3D neural network model.

S405: testing the 3D neural network model by using the test set, and determining a better 3D neural network model obtained after the testing as the neural network model used for living body detection.

In summary, the living body detection method provided by the embodiment is a video-based living-body judgment method, does not require users to perform actions such as nodding, head shaking and the like, thereby improving the user experience; the living body detection method can divide the image in the video to be detected into foreground and background according to the optical flow information, then respectively extract features of the foreground image and the background image and predict the category distribution of the foreground image and the category distribution of the background image, and finally fuse the category distribution of the foreground image and the category distribution of the background image, so as to effectively avoid the interference of the background image to the foreground image in the process of feature extraction, focus on local areas, preserve more local information, and improve the living-body judgment accuracy. Compared with the mainstream motion recognition method, the optical flow information is not directly inputted into the neural network model, instead, the image to be detected is divided into the foreground image and the background image, and the foreground image and the background image are inputted into the neural network model, thereby reducing the amount of computation and improving the speed.

In at least one embodiment, the above living body detection method uses the optical flow information of the video to divide the video into foreground and background, then judges the category distribution of the background image and the category distribution of the foreground image, and finally fuses the category distribution of the foreground and the category distribution of the background to obtain a judgment result that whether the video belongs to an attack or a living body. Hereinafter, the above living body detection method will be described according to an order of data preparation, model training and living-body judgment.

Figure 3:
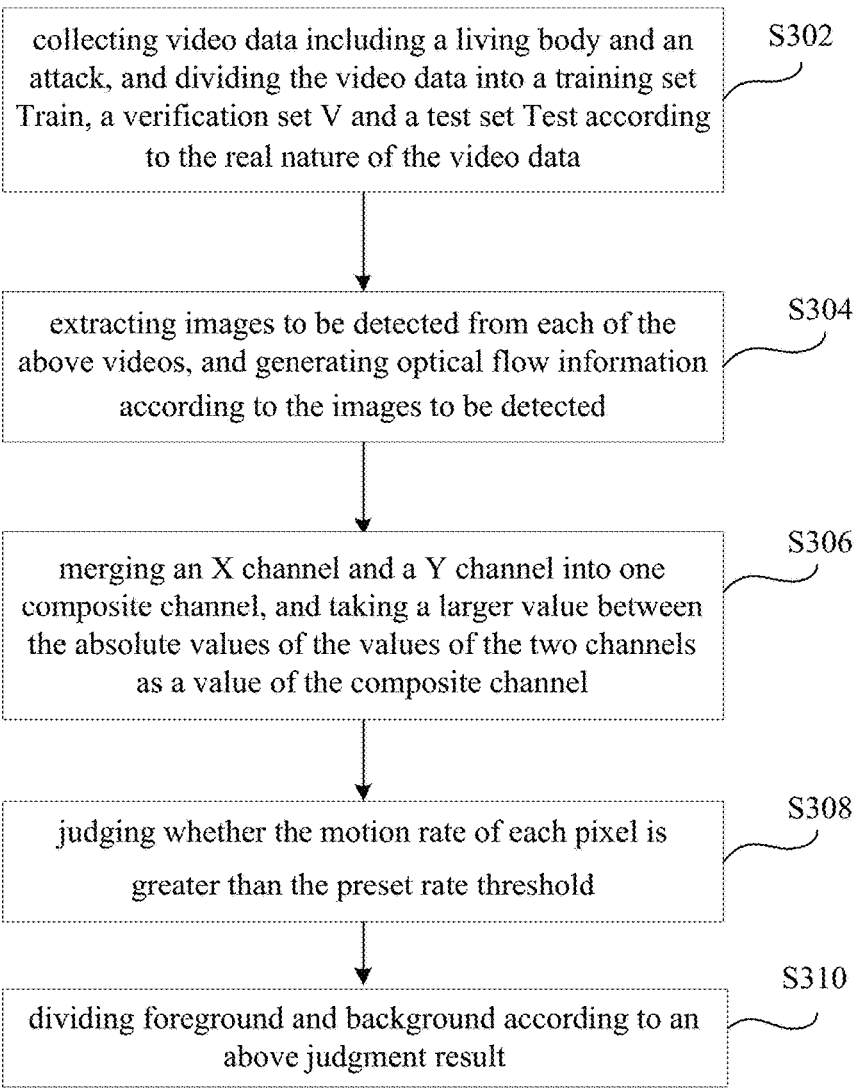
FIG. 3 is a schematic diagram illustrating a data preparation process provided by at least an embodiment of the present disclosure.

(1) Data preparation: collecting and labeling multiple pieces of living body video data and multiple pieces of attack video data, extracting optical flow information of each video (e.g., a living body video or an attack video), dividing the video into foreground and background according to the optical flow information, and dividing the living body video data and the attack video data into a training set Train, a verification set V and a test set Test. With reference to the schematic diagram illustrating the data preparation process as shown in FIG. 3, the following steps can be performed:

S302: collecting video data including a living body and an attack, and dividing the video data into a training set Train, a verification set V and a test set Test according to the real nature of the video data, in which the real nature indicates that the video data belong to a living body video or an attack video; and randomly dividing the video data into various sets according to the real nature of the video data and the requirement on the video quantity of the training set Train, the video quantity of the verification set V and the video quantity of the test set Test.

S304: extracting images to be detected from each of the above videos, and generating optical flow information according to the images to be detected. For instance, the optical flow information is generated by using an OpticalFlowDual_TVL1_GPU method. The optical flow information includes X-channel information and Y-channel information which respectively represent a motion rate of a pixel in an X direction and a motion rate of the pixel in a Y direction, that is, the X-channel information represents the motion rate of the pixel in the X direction and the Y-channel information represents the motion rate of the pixel in the Y direction.

S306: merging an X channel and a Y channel into one composite channel, and taking a larger value between the absolute values of the values of the two channels (namely the X channel and the Y channel) as a value of the composite channel. Because in the subsequent step, judging whether the motion rate of the pixel is greater than a preset rate threshold may be determined only according to the maximum motion rate of the pixel in a specific direction, the merging of the X channel and the Y channel is performed in the step S306.

S308: judging whether the motion rate of each pixel is greater than the preset rate threshold.

S310: dividing foreground and background according to an above judgment result.

Figure 4:
FIG. 4 is a schematic diagram illustrating a process that an image to be detected is divided into a foreground image and a background image provided by at least an embodiment of the present disclosure.

For example, in the step S308, whether the motion rate of each pixel is greater than the preset rate threshold is judged to obtain a judgment result, and in the step S310, the foreground and background are divided based on the judgment result. If the judgment result is that a motion rate of a pixel is greater than the preset rate threshold, it is determined that the pixel belongs to foreground, or if the judgment result is that the motion rate of a pixel is not greater than the preset rate threshold, it is determined that the pixel belongs to background, and then the foreground and the background can be divided according to this. FIG. 4 is a schematic diagram illustrating a process that an image to be detected is divided into a foreground image and a background image. The images from left to right in FIG. 4 respectively are: an original image, optical flow information generated according to the original image and an image adjacent to the original image, a background image b divided based on the optical flow information, and a foreground image f divided based on the optical flow information.

Figure 5:
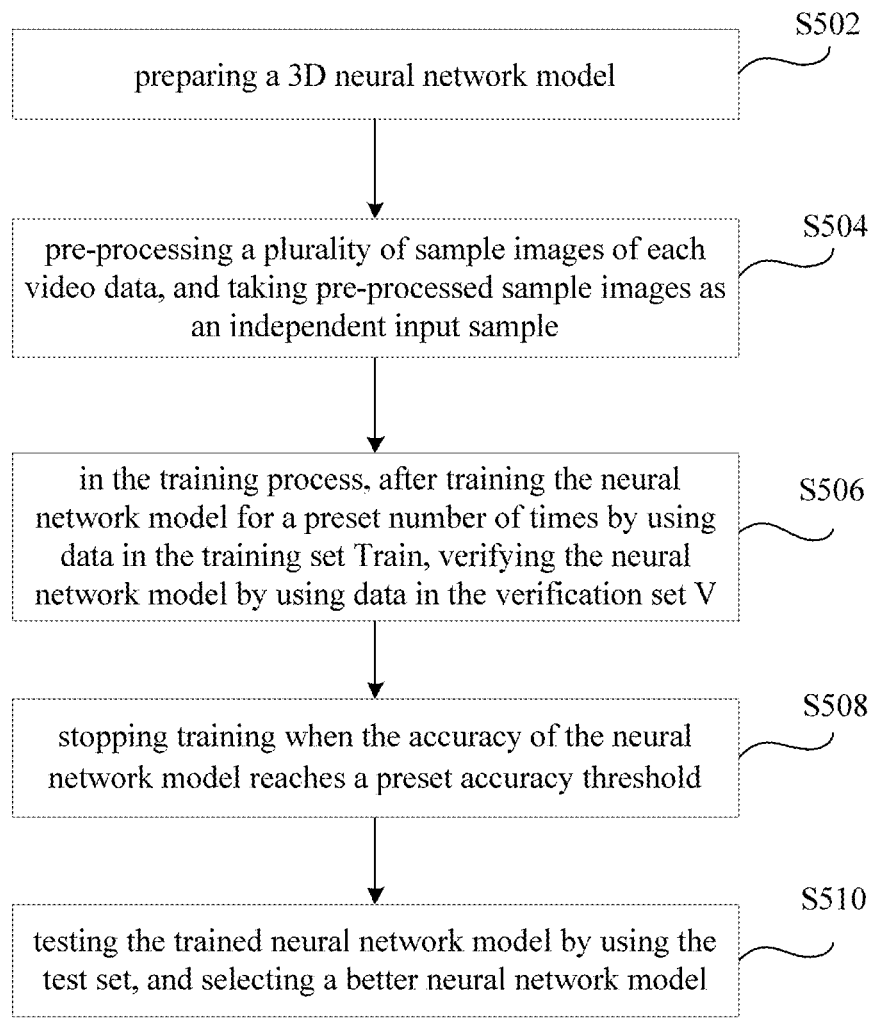
FIG. 5 is a schematic diagram illustrating a model training process provided by at least an embodiment of the present disclosure.

(2) Model training: training the neural network model with a foreground image f and a background image b in the training set Train respectively. FIG. 5 is a schematic diagram illustrating a training process of a neural network model. The following steps can be performed:

S502: preparing a 3D neural network model. The 3D neural network model may adopt ResNet152 architecture. The 3D neural network model can simultaneously focus on spatial domain information S and time domain information T of data. ResNet152 refers to Residual Networks architecture with the depth of 152 layers. It should be noted here that other models and architectures may also be adopted for training and classification according to actual demands. The embodiment is not limited thereto.

S504: pre-processing a plurality of sample images of each video data, and taking pre-processed sample images as an independent input sample. A complete input sample inputted into the neural network model is a video and a label (belonging to a living body video or an attack video) carried by the video, so an input sample includes a plurality of sample images. Pre-processing operations, such as flipping, random cutting, resolution adjustment, or the like, are performed on the plurality of sample images of the same video, and these pre-processed sample images are accumulated and taken as one individual input sample. The objective of pre-processing the sample images is to increase the randomness of the input sample.

S506: in the training process, after training the neural network model for a preset number of times by using data in the training set Train, verifying the neural network model by using data in the verification set V. In the training process, partial data needs to be extracted from the verification set V every few times to verify the neural network model.

S508: stopping training when the accuracy of the neural network model reaches a preset accuracy threshold. The time of stopping training the neural network model is determined according to the performance of the neural network model on the verification set V. The preset accuracy threshold, for instance, may be 99.7%.

S510: testing the trained neural network model by using the test set, and selecting a better neural network model. Before the step of inputting the test set into the neural network model, resolution adjustment (the resolution adapted to the model) may be performed on the test set. The trained neural network model is tested, and a neural network model with a high accuracy is selected as the neural network model used for the living body detection.

Figure 6:
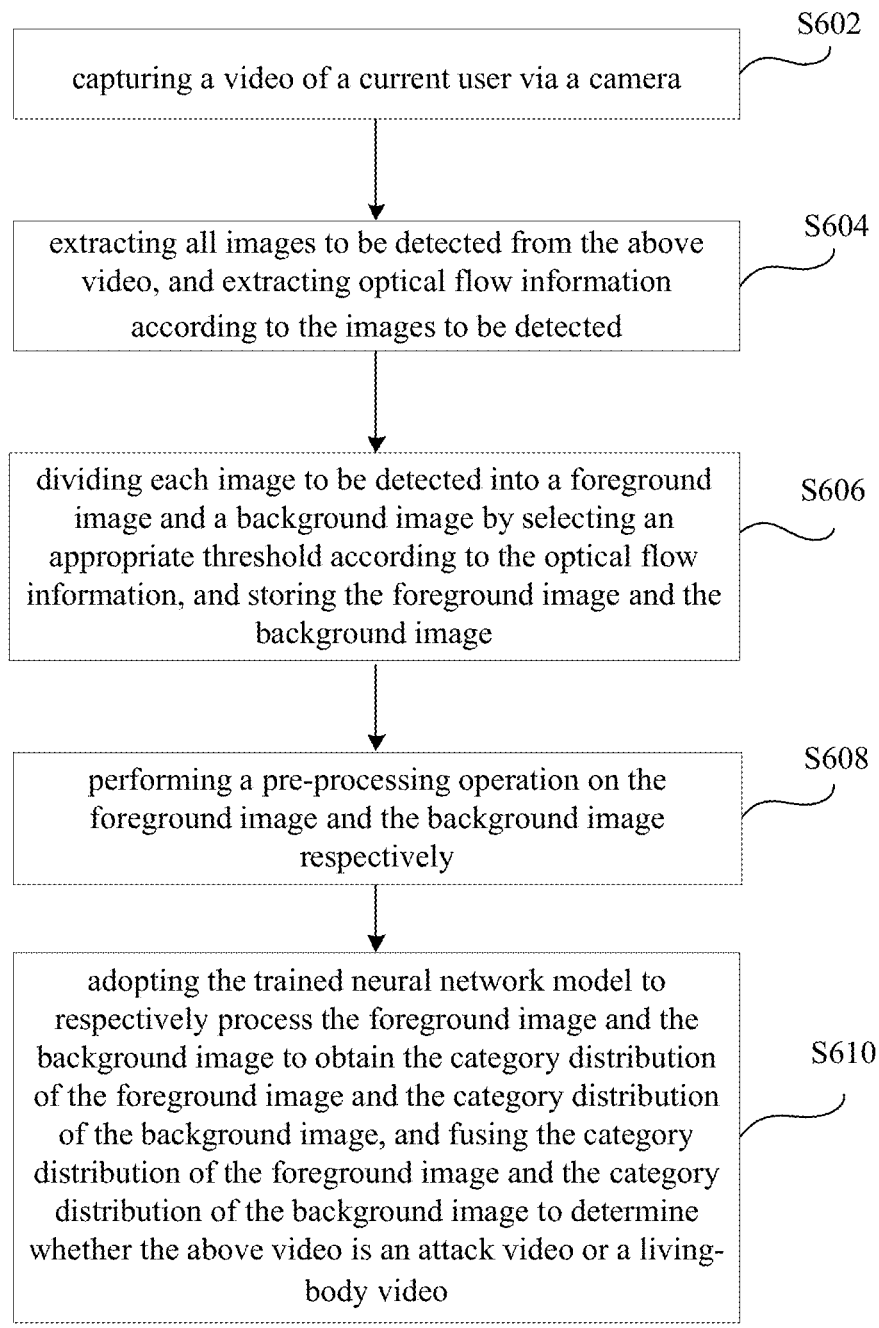
FIG. 6 is a schematic diagram illustrating a living-body judgment process provided by at least an embodiment of the present disclosure.

(3) Living-body judgment: inputting the foreground image and the background image into the 3D neural network model to obtain the category distribution of the foreground image and the category distribution of the background image. The category distribution of the foreground image indicates a probability that the foreground image belongs to an attack and a probability that the foreground image belongs to a living body, and the category distribution of the background image also indicates a probability that the background image belongs to an attack and a probability that the background image belongs to a living body. The probability distribution of the video is obtained by fusing the probabilities of both and is taken as a basis for determining whether the video is a living-body video. FIG. 6 is a schematic diagram illustrating a living-body judgment process. As shown in FIG. 6, the living-body judgment process may include following steps:

S602: capturing a video of a current user via a camera. The user can be prompted to watch the camera for 2-3 seconds, and does not need to perform actions such as blinking, nodding, head shaking, etc. After capturing the video is completed, the video is stored and uploaded to a server, and the above 3D neural network model is stored on the server.

S604: extracting all images to be detected from the above video, and extracting optical flow information according to the images to be detected. The step has been described above, and similar descriptions will be omitted here.

S606: dividing each image to be detected into a foreground image and a background image by selecting an appropriate threshold according to the optical flow information, and storing the foreground image and the background image.

S608: performing a pre-processing operation on the foreground image and the background image respectively.

S610: adopting the trained neural network model to respectively process the foreground image and the background image to obtain the category distribution of the foreground image and the category distribution of the background image, and fusing the category distribution of the foreground image and the category distribution of the background image to determine whether the above video is an attack video or a living-body video. The category distribution of the foreground image or the category distribution of the background image includes the probability of belonging to the attack category and the probability of belonging to the living body category, and a sum of the probability of belonging to the attack category and the probability of belonging to the living body category is 1. The probability that the foreground image belongs to an attack category and the probability that the background image belongs to the attack category can be fused to obtain a probability that the video belongs to the attack category; and the probability that the foreground image belongs to a living-body category and the probability that the background image belongs to the living-body category can be fused to obtain a probability that the video belongs to the living-body category.

In summary, the living body detection method provided by the embodiment of the present disclosure belongs to a dynamic video living body detection method, does not require the user to perform actions such as blinking, nodding, head shaking or the like, can improve the user experience, can effectively avoid the interference of the background to the foreground in the process of feature extraction, focus on local areas, and preserve more local information. Using the foreground images and the background images as the input of the neural network model reduces the amount of computation and improves the speed.

Figure 7:
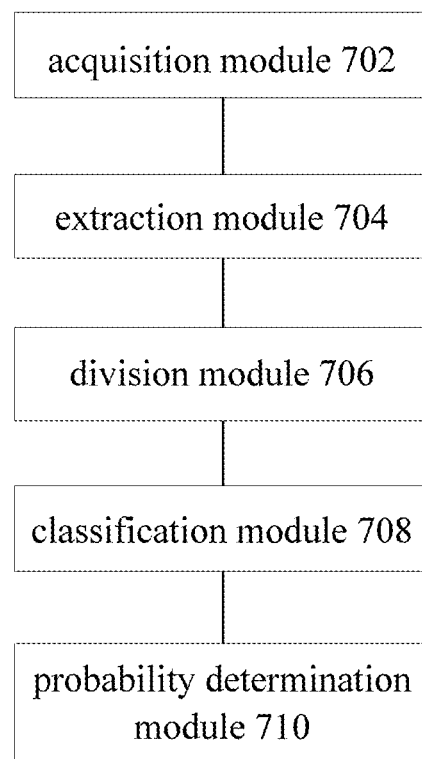
FIG. 7 is a structural block diagram of a living body detection device provided by at least an embodiment of the present disclosure.

As for the living body detection method provided by the above embodiment, an embodiment of the present disclosure provides a living body detection device. FIG. 7 is a structural block diagram of a living body detection device provided by an embodiment of the present disclosure. As shown in FIG. 7, the living body detection device comprises: an acquisition module 702 configured to acquire a video including an object to be detected; an extraction module 704 configured to extract at least two images to be detected from the video including the object to be detected, and determine optical flow information according to the at least two images to be detected; a division module 706 configured to divide each image to be detected into a foreground image and a background image according to the optical flow information; a classification module 708 configured to use a classifier to perform category judgment on the foreground image and the background image to obtain a category distribution of the foreground image and a category distribution of the background image; and a probability determination module 710 configured to obtain a probability that the object to be detected is a living body according to the category distribution of the foreground image and the category distribution of the background image.

The living body detection device provided by the embodiment of the present disclosure can divide the image to be detected in the video into the foreground image and the background image according to the optical flow information of the video to be detected, input the foreground image and the background image into the classifier (for instance, the classifier includes the pre-trained CNN model) for category judgment, obtain the category distribution of the foreground image and the category distribution of the background image, and obtain a probability that the object to be detected is a living body according to the category distribution of the foreground image and the category distribution of the background image. The above living body detection device performs the living body detection by adopting the optical flow information, does not need the user to perform actions such as nodding, head shaking or the like, thereby improving the user experience; and the motion rate of each pixel in the image to be detected is respectively determined according to the optical flow information, so as to achieve foreground and background division of the image to be detected, which can effectively reduce the interference of the background to the foreground motion recognition in the process of feature extraction, preserve more local information, and improve the recognition accuracy.

In at least one embodiment, the above division module 706 includes: a determination unit configured to determine that each pixel belongs to foreground or background according to the motion rate of each pixel in the optical flow information; and a combination unit configured to combine all pixels belonging to the foreground in the image to be detected into a foreground image and combine all pixels belonging to the background in the image to be detected into a background image.

In at least one embodiment, the determination unit includes: a motion rate determination sub-unit configured to determine the motion rate of each pixel in each image to be detected according to the optical flow information; a motion rate judgment sub-unit configured to judge whether the motion rate of each pixel in the optical flow information is greater than a preset rate threshold; and a foreground-background determination sub-unit configured to acquire a judgment result outputted by the motion rate judgment sub-unit, determine that the pixel belongs to foreground if the judgment result is that the motion rate of each pixel is greater than the preset rate threshold, and determines that the pixel belongs to background if the judgment result is that the motion rate of each pixel is not greater than the preset rate threshold.

Where, the motion rate determination sub-unit is also configured to: acquire X-channel information and Y-channel information of each pixel in each image to be detected, the X-channel information and the Y-channel information respectively representing a motion rate in an X direction and a motion rate in a Y direction; and determine a larger value between the motion rate in the X direction and the motion rate in the Y direction as the motion rate of each pixel.

In at least one embodiment, the probability determination module 710 is also configured to: respectively acquire a first probability that the foreground image belongs to a living-body category and a second probability that the background image belongs to the living-body category from the category distribution of the foreground image and the category distribution of the background image; and fuse the first probability and the second probability by using a preset fusion algorithm to obtain the probability that the object to be detected is the living body.

In at least one embodiment, the living body detection device further comprises: a living-body judgment module configured to judge whether the probability that the object to be detected is the living body is greater than a preset living-body probability threshold; and a living-body determination module configured to acquire a judgment result outputted by the living-body judgment module, determine that the object to be detected is the living body if the judgment result is that the probability that the object to be detected is the living body is greater than the preset living-body probability threshold, and determine that the object to be detected is an attack (namely a non-living body) if the judgment result is that the probability that the object to be detected is the living body is less than the preset living-body probability threshold.

In at least one embodiment, the living body detection device further comprises: a training module configured to: acquire sample video data, the sample video data including foreground sets and background sets corresponding to sample videos, and the sample videos including a living-body video and an attack video; divide the sample video data into a training set, a verification set and a test set; train a 3D neural network model by using the training set; stop training when the 3D neural network model is adopted to classify the verification set to obtain a classification accuracy and the classification accuracy is greater than the preset accuracy threshold; and test the 3D neural network model by using the test set and determine the 3D neural network model obtained after the testing as the neural network model used for the living body detection. The above training module is also configured to: perform a pre-processing operation on sample images extracted from the sample videos, and the pre-processing operation at least includes one of following operations: flipping, cutting or resolution adjustment.

The implementation principle and the technical effects of the living body detection device provided by the embodiment are the same with those of the foregoing living body detection method. For a brief description, portions not described in the embodiments of the living body detection device can refer to corresponding contents in the embodiments of the foregoing living body detection method.

In addition, an embodiment of the present disclosure further provides a living body detection system, and the living body detection system comprises: a video capture device, a processor and a storage device. The video capture device is configured to capture a video including an object to be detected; the storage device stores computer programs; and when the computer programs are executed by the processor, the living body detection method provided by any one of the above embodiments is performed.

It can be clearly understood by those skilled in the art that for convenience and simplicity of description, for descriptions of a specific working process of the living body detection system, reference may be made to the corresponding content in the embodiments of the foregoing living-body detecting method, and repeated portions will be omitted here.

Moreover, an embodiment of the present disclosure further provides a computer-readable storage medium. The computer-readable storage medium stores computer programs. When the computer programs are executed by a processor, steps of the living body detection method provided by any one of the above embodiments are performed.

Instructions included in the computer programs may be used for performing the living body detection method described in the embodiments of the foregoing living body detection method; for a specific implementation process, reference may be made to the embodiments of the living body detection method; and repeated portions will be omitted here. When functions are implemented in the form of a software functional unit and the software functional unit is sold or used as an independent product, the functions can be stored in a computer-readable storage medium. Based on such an understanding, the technical solutions of the present disclosure or the parts contributing to the prior art or all parts of the technical solutions can be embodied in the form of computer software products. The computer software products are stored in a storage medium and include a number of instructions used for driving a computer device (which may be a personal computer, a server, a network device, etc.) to perform all or partial steps of the living body detection method provided by the embodiment of the present disclosure. The foregoing storage medium comprises: various kinds of media capable of storing program codes such as a USB flash disk, a portable hard disk, a read-only memory (ROM), a random access memory (RAM), a magnetic disk, an optical disk, or the like.

It should be stated that: in the embodiments of the present, "multiple pieces" indicates two or more pieces, namely greater than or equal to two pieces; "plurality of" indicates two or more, namely greater than or equal to two.

Finally, it should be stated that: the above embodiments are only specific implementations of the present disclosure, are used to explain the technical solutions of the present disclosure and thus are not limitative to the present disclosure, the protection scope of the present disclosure is not limited thereto. Although the present disclosure has been described in detail with reference to the foregoing embodiments, those of ordinary skill in the art will understand that: any skilled in the art, within the technical scope disclosed by the present disclosure, can still modify the technical solutions described in the foregoing embodiments and can easily think of variations or equivalent replacements of some of the technical features, the modifications, variations or substitutions of the present disclosure do not depart from the spirit and scope of the technical solutions of the embodiments of the present disclosure, and are intended to be covered within the protection scope of the embodiment of the present disclosure. Therefore, the protection scope of the present disclosure should be based on the protection scope of the claims.

What is claimed is:

1. A living body detection method, comprising:
acquiring a video including an object to be detected;
extracting at least two images to be detected from the video, and determining optical flow information according to the at least two images to be detected;
dividing each image to be detected into a foreground image and a background image according to the optical flow information;
using a classifier to perform category judgment on the foreground image and the background image to obtain a category distribution of the foreground image and a category distribution of the background image, wherein the category distribution of the foreground image indicates a probability that the foreground image belongs to an attack category and a probability that the foreground image belongs to a living-body category, and the category distribution of the background image indicates a probability that the background image belongs to the attack category and a probability that the background image belongs to the living-body category;
respectively acquiring a first probability that the foreground image belongs to the living-body category and a second probability that the background image belongs to the living-body category according to the category distribution of the foreground image and the category distribution of the background image; and
fusing the first probability and the second probability through a preset fusion algorithm to obtain a probability that the object to be detected is a living body.

2. The method according to claim 1, wherein the classifier comprises a neural network model; and
using the classifier to perform category judgment on the foreground image and the background image to obtain the category distribution of the foreground image and the category distribution of the background image comprises:
inputting the foreground image and the background image into the neural network model; and
using the neural network model to perform the category judgment on the foreground image and the background image to obtain the category distribution of the foreground image and the category distribution of the background image.

3. The method according to claim 2, further comprising:
acquiring sample video data, wherein the sample video data comprises foreground sets and background sets corresponding to sample videos, and the sample videos comprise a living-body video and an attack video;
dividing the sample video data into a training set, a validation set and a test set;
training a 3D neural network model by using the training set;
stopping training when the 3D neural network model is adopted to classify the validation set to obtain a classification accuracy and the classification accuracy is greater than a preset accuracy threshold; and
testing the 3D neural network model by using the test set, and determining the 3D neural network model obtained after the testing as the neural network model used for living body detection.

4. The method according to claim 3, wherein after acquiring the sample video data, the method further comprises:
performing a pre-processing operation on sample images extracted from the sample videos,
wherein the pre-processing operation at least comprises one of following operations:
flipping, cutting or resolution adjustment.

5. The method according to claim 1, wherein dividing each image to be detected into the foreground image and the background image according to the optical flow information comprises:
determining that each pixel belongs to foreground or background according to a motion rate of each pixel in the optical flow information; and
combining pixels belonging to the foreground in each image to be detected into the foreground image, and combining pixels belonging to the background in each image to be detected into the background image.

6. The method according to claim 5, wherein determining that each pixel belongs to the foreground or the background according to the motion rate of each pixel in the optical flow information comprises:
determining the motion rate of each pixel in each image to be detected according to the optical flow information; and
judging whether a motion rate of a pixel is greater than a preset rate threshold, determining that the pixel belongs to the foreground in a case where the motion rate of the pixel is greater than the preset rate threshold, and determining that the pixel belongs to the background in a case where the motion rate of the pixel is not greater than the preset rate threshold.

7. The method according to claim 6, wherein determining the motion rate of each pixel in each image to be detected according to the optical flow information comprises:
acquiring X-channel information and Y-channel information of each pixel in each image to be detected, wherein the X-channel information and the Y-channel information respectively represent a motion rate in an X direction and a motion rate in a Y direction; and
determining a larger value between the motion rate of the X direction and the motion rate of the Y direction as the motion rate of each pixel.

8. The method according to claim 1, further comprising:
judging whether the probability that the object to be detected is the living body is greater than a preset living-body probability threshold; and
determining that the object to be detected is the living body in a case where the probability that the object to be detected is the living body is greater than the preset living-body probability threshold.

9. A living body detection system, comprising:
a video capture device;
a processor; and
a storage device,
wherein the video capture device is configured to capture a video including an object to be detected;
wherein computer programs are stored in the storage device that, when executed by the processor, cause the processor to:
extract at least two images to be detected from the video, and determine optical flow information according to the at least two images to be detected,
divide each image to be detected into a foreground image and a background image according to the optical flow information,
use a classifier to perform category judgment on the foreground image and the background image to obtain a category distribution of the foreground image and a category distribution of the background image, wherein the category distribution of the foreground image indicates a probability that the foreground image belongs to an attack category and a probability that the foreground image belongs to a living-body category, and the category distribution of the background image indicates a probability that the background image belongs to the attack category and a probability that the background image belongs to the living-body category, respectively acquire a first probability that the foreground image belongs to the living-body category and a second probability that the background image belongs to the living-body category according to the category distribution of the foreground image and the category distribution of the background image, and fuse the first probability and the second probability through a preset fusion algorithm to obtain a probability that the object to be detected is a living body.

10. A non-transitory computer-readable storage medium, wherein computer programs are stored on the non-transitory computer-readable storage medium; that, when executed by a processor, perform operations comprising:

acquiring a video including an object to be detected;

extracting at least two images to be detected from the video, and determining optical flow information according to the at least two images to be detected;

dividing each image to be detected into a foreground image and a background image according to the optical flow information;

using a classifier to perform category judgment on the foreground image and the background image to obtain a category distribution of the foreground image and a category distribution of the background image, wherein the category distribution of the foreground image indicates a probability that the foreground image belongs to an attack category and a probability that the foreground image belongs to a living-body category, and the category distribution of the background image indicates a probability that the background image belongs to the attack category and a probability that the background image belongs to the living-body category;

respectively acquiring a first probability that the foreground image belongs to the living-body category and a second probability that the background image belongs to the living-body category according to the category distribution of the foreground image and the category distribution of the background image; and fusing the first probability and the second probability through a preset fusion algorithm to obtain a probability that the object to be detected is a living body.

\* \* \* \* \*